INVENTORS
JAMES B. ARTHUR
WILLIAM BARDSLEY
MICHAEL A.C.S. BROWN
ALAN F. GIBSON
BY Cushman, Darby & Cushman
Attorneys INVENTORS
JAMES B. ARTHUR
WILLIAM BARDSLEY
MICHAEL A.G.S. BROWN
ALAN F. GIBSON
BY Cushman, Darby & Cushman
Attorneys INVENTORS
JAMES B. ARTHUR
WILLIAM BARDSLEY
MICHAEL A.C.S. BROWN
ALAN F. GIBSON
BY Cushman, Darby & Cushman
Attorneys INVENTORS
JAMES B. ARTHUR
WILLIAM BARDSLEY
MICHAEL A.C.S. BROWN
ALAN F. GIBSON
BY Cushman, Darby & Cushman
Attorneys INVENTORS
JAMES B. ARTHUR
WILLIAM BARDSLEY
MICHAEL A.C.S. BROWN
ALAN F. GIBSON
BY Cushman, Darby & Cushman
Attorneys United States Patent Office 2,931,958
Patented Apr. 5, 1960

2,931,958

SEMI-CONDUCTOR DEVICES

James B. Arthur and William Bardsley, Malvern, Michael Anton Cedric Salkeld Brown, Malvern Link, and Alan Frank Gibson, Malvern, England, assignors to National Research Development Corporation, London, England, a corporation of Great Britain Application April 19, 1955, Serial No. 502,354

Claims priority, application Great Britain May 3, 1954

11 Claims. (Cl. 317—234)

This invention relates to semi-conductor devices.

In many semi-conductor devices useful effects are obtained by the use of at least one electrode making rectifying contact with a mass of semi-conductor.

An example of such a device is the so-called crystal diode in which a rectifier, that is a device having an asymmetric voltage-current characteristic, is formed between one such electrode and a base (i.e. ohmic) electrode connected to the semi-conductor mass.

Another example of such a device is the so-called transistor in which two closely spaced electrodes each make rectifying contact with the semi-conductor mass and together with a base (i.e. ohmic) electrode form a three electrode device, sometimes called a crystal triode, akin to a three-electrode thermionic valve.

In the crystal diode and the transistor a phenomenon known as minority carrier storage tends to limit the speed of response; and thermal generation of minority carriers limits the temperature range at which they can operate.

The term "minority carrier" denotes a hole or an electron according to the conductivity type, n or p respectively, of the semiconductor material in which it is a minority carrier.

Minority carrier storage is an effect due to the movement of minority carriers through the semi-conductor by diffusion paths as distinct from movement along a controlled path brought about by an electric field applied at a rectifying contact. Minority carriers moving by diffusion paths may, after a time of course, come within the influence of such a field but by then will constitute an unwanted contribution to the flow of minority carriers to a rectifying contact by legitimate paths.

Thermally-generated minority carriers may also make an unwanted contribution to the flow of minority carriers to a rectifying contact.

It has been discovered that if provision is made to extract minority carriers from the mass of semi-conductor without causing any further injection then the unwanted minority carriers themselves are reduced in number and the limitations due to minority carrier storage and thermal generation are reduced.

In our earlier work this discovery was referred to as "extraction" but it is now referred to as "exclusion"—not because the word "extraction" is inherently unsuitable but to distinguish from a phenomenon previously described by Banbury concerning a reduction in density of electrons by extraction from point contacts on p-type semi-conductor materials. (See Proc. Phys. Soc., 66, B, 50(1953).)

According to the invention therefore a semi-conductor device comprises a mass of semi-conductor material, at least one electrode making rectifying contact with the mass, a base electrode making ohmic contact with the mass, and means for excluding minority carriers from the mass.

Exclusion of minority carriers can be effected relatively easily in devices such as crystal diodes and transistors by reducing the number of current carriers (hole-electron pairs) in the semi-conductor mass, that is by the exclusion of current carriers; for example by the application of an electric field to the mass through non-injecting connections, i.e. connections which do not permit the injection of minority carriers into the semi-conductor.

Suitable non-injecting connections for a mass of semi-conductor material of a given conductivity type are a first base (i.e. ohmic) electrode connected to the mass and a second base electrode connected to a region of semi-conductor material of the given conductivity type and having a high significant impurity concentration relative to that of the mass, the region itself being contiguous with the mass at a common boundary.

The region of semi-conductor material having a high relative impurity concentration ensures that any minority carriers injected at the second base electrode combine before reaching the common boundary; the impurity concentration is made high enough to ensure that there is a negligible injection from the region over the common boundary.

A suitable voltage applied across the two base electrodes then produces a current in the semi-conductor, which gives exclusion, without casuing injection of minority carriers due to the base electrodes or to the high-impurity region itself.

Significant impurities determine the conductivity type, p or n, of the semi-conductor material. For instance an example of p-type germanium is germanium containing an impurity such as indium whereas for n-type germanium a typical significant impurity is antimony. The concentration of the impurity determines the actual conductivity of material.

To assist further in the understanding of the invention the phenomenon of exclusion will now be discussed at length and followed by examples of semi-conductor devices involving exclusion, reference being made to the accompanying drawings, in which.

*A method of exclusion*

Figure 1:
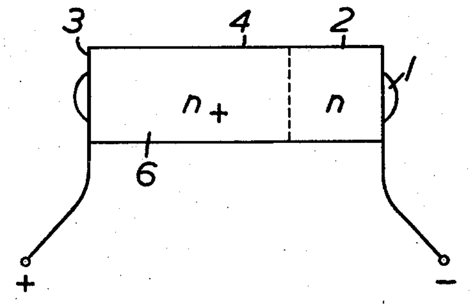
Fig. 1 shows a mass of semi-conductor arranged for exclusion.

Consider a long rod or filament of any intrinsic semi-conductor to which a suitable voltage is applied. Electrons will pass out at the positive connection and holes out at the negative connection. From space charge considerations the number of holes and electrons in the semi-conductor are at all times equal. If, therefore, the rate of generation of hole/electron pairs in the specimen is less than the rate of removal by the applied field then the number of current carriers will be depleted and exclusion may be said to have occurred.

To put the above argument on a more quantitative basis let $n_i$ be the intrinsic electron density and suppose that some exclusion has taken place. The density of hole/electron pairs in the specimen is now $n$, where $n<n_i$.

Then:

The number of hole/electron pairs generated in the specimen per second is given by $n_iV/\tau$.

The number of hole/electron pairs recombining in the specimen per second is given by $nV/\tau$.

The number of hole/electron pairs extracted from the specimen per second is given by $nV/t$.

Where V is the volume of the crystal, $\tau$ the carrier lifetime and $t$ the transit time of the slowest moving carriers (holes) across the crystal.

In equilibrium the rates of recombination and extraction must together equal the rate of generation, so that $$\frac{n_i}{\tau}=n\left(\frac{1}{\tau}+\frac{1}{t}\right)$$

or $$n=\frac{n_i t}{\tau+t} \tag{1}$$

Thus if sufficiently large voltages are applied, such that $t<\tau$, noticeable amount of exclusion should occur.

In practice no semi-conductor is entirely free from significant impurities which donate free electrons or holes in addition to the intrinsic hole/electron pairs. These impurity carriers cannot be excluded because, if they were, the semi-conductor would carry a net charge due to the ionised impurities remaining. Hence it is expected that the resistance of a semi-conductor will not increase indefinitely with voltage but will reach some limiting value determined by the density of impurities in the sample.

*Practical considerations*

Equation 1 above assumes that the only source of hole/electron pairs is thermal generation in the semiconductor. In practice, however, an appreciable number of minority carriers may be injected into the semi-conductor from the end connections. If the rate of injection is comparable with the rate of thermal generation of carriers Equation 1 no longer applies and exclusion is not likely to be observed. The importance of injection from the end connections can best be illustrated by means of the following example.

If the current through the specimen is $i$ amps, the injection ratio of the end connection $\gamma$, and $q$ the electrode charge we require the condition $$\frac{i.\gamma}{q}<\frac{n_i.V}{10.\tau} \tag{2}$$

where the factor 10 has been introduced simply to ensure that the rate of carrier injection is at least an order of magnitude less than the generation rate. For a typical semi-conductor mass having dimensions of 2 mms.×0.5 mm.×0.5 mm., a lifetime of 100$\mu$ seconds and requiring a current of 1 ma., Equation 2 requires $$\gamma\lesseqgtr 5\times10^{-4}$$

The injection ratio of simple mechanical contacts on germanium for example is about unity and for soldered (apparently ohmic) connections $\gamma$ lies between $10^{-2}$ and $10^{-1}$. Thus some consideration must be given to the end connections if Equation 2 is to be satisfied.

Consider now with reference to Fig. 1, a body of germanium 3 connected across its ends by soldered connections to a positive connection + and a negative connection −. A region 6 of the body 3 is composed of strongly n-type (n+) material and a region 2 is composed of n-type (n) material. Thus the region 2 which comprises n-type germanium has one end connection consisting of the soldered electrode 1 and a second end connection consisting of the n+ region 6 to which an electrode has also been soldered.

As shown the n+ region 6 is positively biassed and only the injection of holes into the region 2 from the region 6 need be considered.

Thus:

(*a*) The soldered end connection to the region 6 can be placed sufficiently far from the region 2 so that all holes injected at the end connection have recombined before reaching the region 2, (*b*) The density of holes in the n+ region 6 can be made so small that most of the current from the region 6 to the region 2 is carried by electrons.

The effective injection ratio $\gamma$ across an n+/n junction of the type shown in Fig. 1 can be derived approximately from the theory of p/n junctions due to Shockley (1949, Bell Syst. Tech. J., 28, 435) and is given by $$\gamma=\delta_n L p/\delta_{n+}\cdot L_{p+}$$

where $\delta_n$, $\delta_{n+}$ and $Lp$, $L_{p+}$ are the conductivities and minority carrier diffusion lengths respectively of the regions 2 and 6. The above value for $\gamma$ assumes that the current on each side of the junction is carried entirely by diffusion. In practice this will be true only of the region 6. If the current on both sides of the junction were field controlled, calculations indicate that $\gamma$ would be very much less than the above. The intermediate case, which is of importance here, is more difficult to calculate but it is believed that the above formula indicates an upper limit for $\gamma$, which is all that is required.

It follows, therefore, that the problem of making a suitable non-injecting end connection reduces to a crystal growing problem, notably the growth of a heavily doped (i.e. n+), long diffusion length crystal. The required crystals have been grown and typical values of the above quantities obtained in the samples used are as follows:

$\sigma_n$:0.025 ohm$^{-1}$ cm.$^{-1}$ (40 ohm. cms. resistivity).
$L_p$:0.6 mm. (Approximately 90$\mu$ secs. lifetime. Lifetime reduced by surface re-combination.)
$\sigma_{n+}$:500 ohm.$^{-1}$ cm.$^{-1}$ (0.002 ohm cm. resistivity).
$L_{p+}$:0.2 mm. (Approximately 40$\mu$ secs. lifetime. Mobility reduced by impurity scattering.)
Hence $\gamma=1.75\times10^{-4}$ and the required condition is achieved.

The region 2 was typically 2 mms. long and the heavily doped region 6 about 4 mms. (i.e. about 20 $L_{p+}$) long. The doping agent was antimony. The total resistance of the specimen was entirely determined by the resistance of the region 2.

*Exclusion by D.C. fields*

Figure 2:
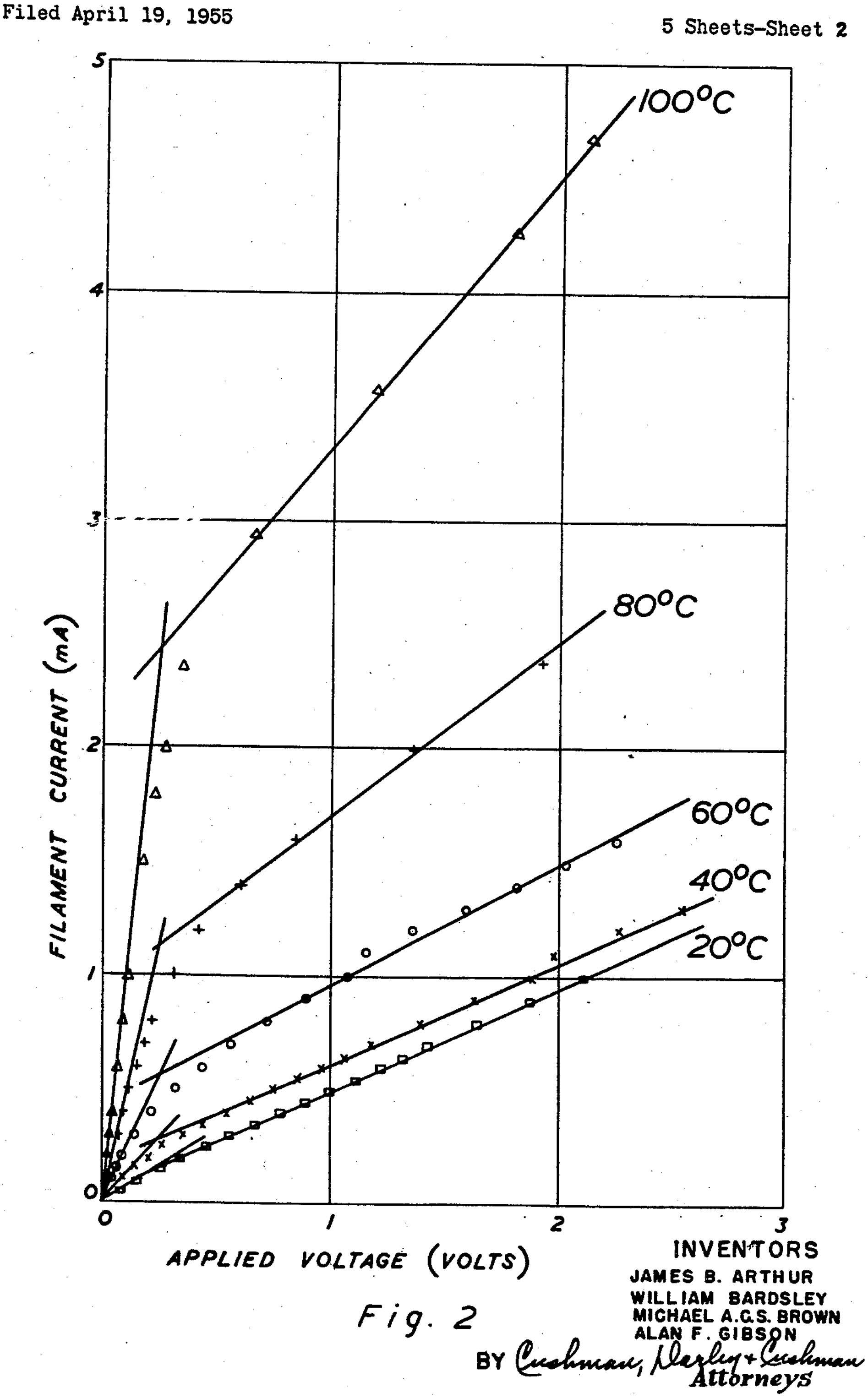
Figs. 2 and 3 show curves illustrating exclusion.

The current/voltage curves at various temperatures of a specimen with the above specification are shown in Fig. 2. These results were obtained with the n+ region made positive. When the polarity was reversed the resistance of the specimen fell with increasing voltage, indicating that injection was occurring.

Inspection of Fig. 2 shows that the expected results are obtained, at least qualitatively. The initial slope of each curve corresponds to the unexcluded conductivity and this increases rapidly with temperature, as would be expected for a slightly n-type specimen. The final slope, corresponding to the conductivity due to the residual impurities, should be invariant with temperature. In fact this is not fully confirmed by experiment. The increased excluded conductivity at high temperatures is due either to self heating or to a little injection, probably the former.

Figure 3:
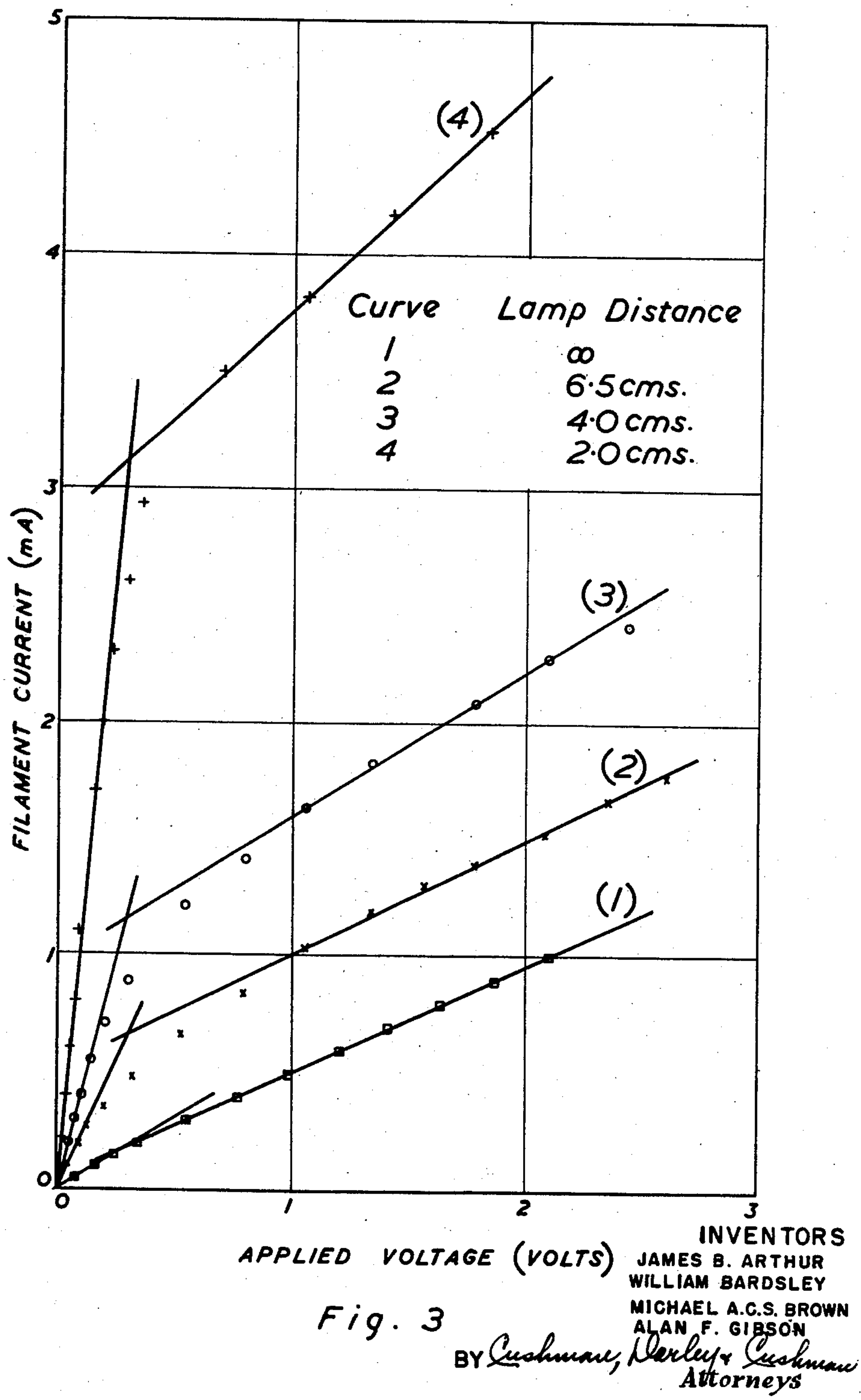

In Fig. 3 are shown a similar set of curves for the same specimen obtained at room temperature under various levels of illumination. The light source was a 36 watt tungsten lamp, the distances between the lamp and the specimen being indicated on the diagram. As might be expected, the effects of light and heat are similar in producing hole/electron pairs, and Figs. 2 and 3 are essentially the same. It will be noticed that the increased excluded conductivity at high currents is also reproduced.

It will be seen from Figs. 2 and 3 that the voltage required to produce a significant amount of exclusion (the "knee" voltage) can be defined fairly accurately. If the knee voltage is determined by extrapolation of the excluded and unexcluded portions it is found to be about 0.25 volt for the specimen used and largely independent of temperature or light intensity. Using Equation 1 it is possible to calculate the knee voltage exactly but it is sufficient for the present purpose to suppose that a significant amount of exclusion will occur when $t=\tau$ and use this as a criterion for the knee voltage. It then follows that the knee voltage $V_k$ is given by $$V_k=\frac{KT}{q}\left(\frac{l}{L_p}\right)^2 \qquad (3)$$

where K is Boltzmann's constant, T the absolute temperature and $l$ the length of the specimen. For a sample in which $l=1.62$ mms., $L_p=0.56$ mm., $kT/q=.025$ volt at room temperature; therefore $Vk=0.21$ volt, in good agreement with experiment. Equation 3 has been found to give a very good indication of the value of $V_k$ for other values of $L_p$.

*Exclusion by pulsed fields*

In the previous section we have described the static characteristics of exclusion systems; in this section we shall indicate their dynamic characteristics.

Figure 4:
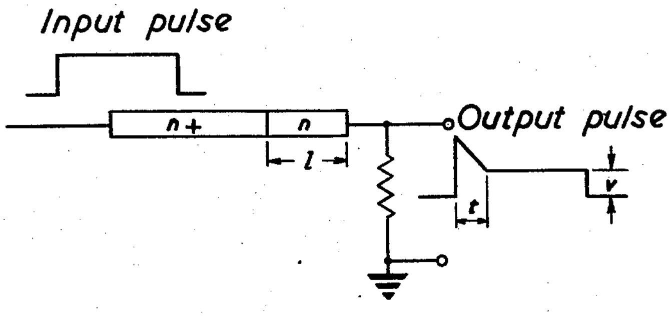
Fig. 4 shows a circuit used in studying the effect of exclusion.

If a constant voltage pulse of suitable magnitude is applied to the crystal exclusion will proceed during the period of the pulse until the limiting resistance is reached. The output waveform across a suitable load resistance will, therefore, be of the form shown in Fig. 4. That this type of waveform is, in fact, observed is in itself a qualitative indication that exclusion is taking place. The time taken for exclusion, $t$, is determined by the mobility of the slowest moving carriers (holes) in the n-type region of the crystal. The time $t$ can be measured with considerable accuracy as a very sharp "knee" occurs at this point. The sharp knee is a consequence of the shockwave that builds up on the trailing edge of the carrier departure wave. This is a well known effect in drift mobility experiments and is due to the large change in carrier concentration at the edge of the carrier departure wave (see Blakemore, J. S., De Barr, A. E. and Gunn, J. B., 1953, Rep. Prog. Phys. 16, 160, for references).

If the exclusion time, $t$, is measured, the carrier velocity and drift mobility may be determined. This experiment, moreover, allows the drift velocity of carriers to be determined well into the intrinsic region of conductivity, i.e. when the numbers of holes and electrons are comparable. For a variety of reasons the drift mobility of injected carriers cannot be studied experimentally in this region. It is expected theoretically that the group velocity of carriers will fall to zero when the semi-conductor becomes very nearly intrinsic the appropriate relation being:

$$\mu_g=\frac{\mu}{1+\left(1+\frac{1}{b}\right)\frac{p}{n_e}} \qquad (4)$$

for n-type material. In this equation the symbols have the following interpretation:

$\mu_g$=effective carrier group mobility
$\mu$="normal" undisturbed carrier mobility
$b$=ratio, electron to hole mobility
$p$=density of holes
$n_e$=density of electrons due to impurities.

It will be noticed that, for normally doped samples ($n_e>p$) $\mu_g=\mu$ and for intrinsic samples ($n_e=0$) $\mu_g=0$.

As far as we are aware, the validity of Equation 4 has never been checked directly, due presumably to the difficulty of making drift measurements in this region. The equation can, however, be checked by the experiment to be described.

Referring to Fig. 3 the conductivity in the excluded condition, $\sigma_e$, can be written as $$\sigma_e=n_e.Q.\mu.b \qquad (5)$$

The conductivity in the unexcluded condition, $\sigma$, can be written as $$\sigma=\sigma_e+p.q.\mu\ (1+b) \qquad (6)$$

where $\mu$ is the normal mobility of holes. Combining Equations 4, 5 and 6 gives $$\mu_g/\mu=\sigma_e/\sigma \qquad (7)$$

a relation which can be checked directly by experiment. The carrier group mobility $\mu_g$, together with $\sigma_e$ and $\sigma$, is determined at room temperature under various levels of illumination and a value of $\mu$ obtained.

Figure 6:
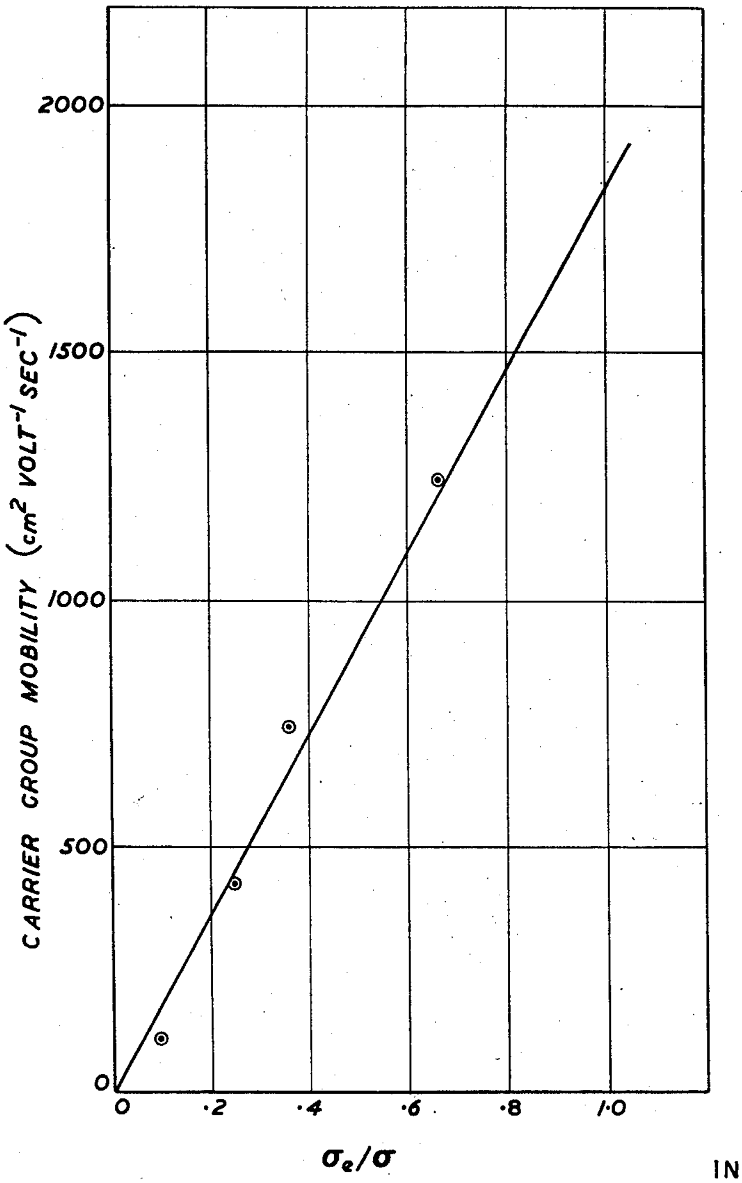
Figs. 5 and 6 show curves to assist explanation of exclusion.
Figure 5:
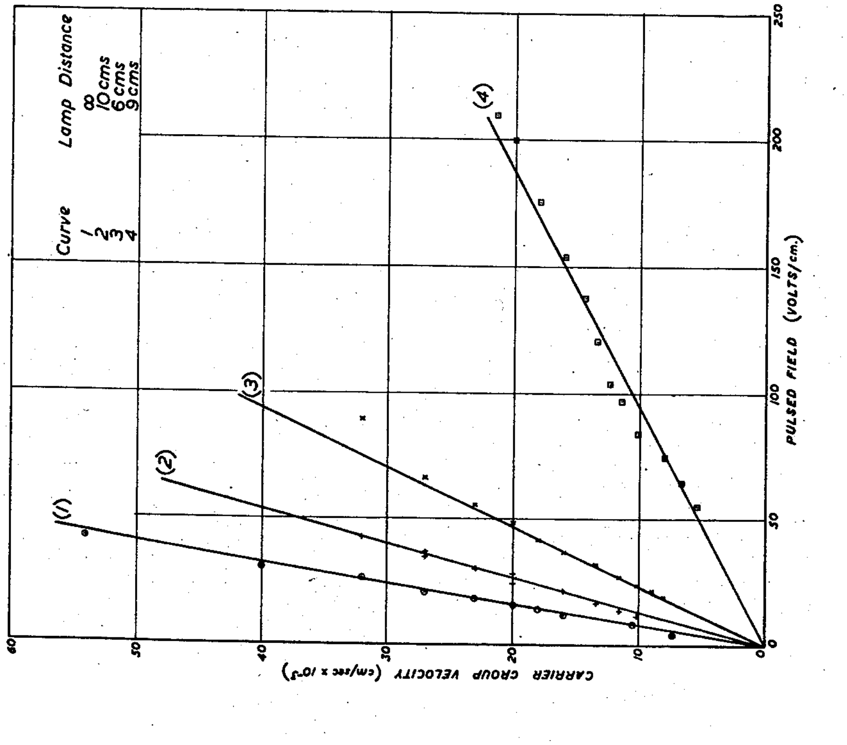

In Fig. 5 we show the carrier group velocity as a function of exclusion field under various levels of illumination. The fall in group velocity with increasing light intensity is evident, the slope of each line representing the mobility. The values of $\sigma_e$ and $\sigma$ can then be determined for each light intensity and the ratio $\sigma_e/\sigma$ plotted against the effective group mobility $\mu_g$. This is done in Fig. 6. The resulting straight line must pass through the origin and the best line indicates a value of $\mu$ of 1840 cms.$^2$/volt second.

*Examples*

Figure 7:
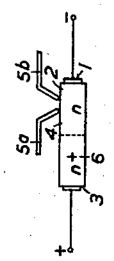
Fig. 7 shows a transistor device arranged for exclusion.

An example of a transistor in which exclusion is used, is shown schematically in Fig. 7. It comprises a germanium body 3 having soldered, therefore ohmic, base electrodes at its ends with an n-type region 2 contiguous with an n+ type region 6. Two electrodes 5 (*a*, *b*) make rectifying contact with a side 4 of the region 2. In the manufacture of the device the side 4 is ground and etched and the contacts of the electrodes 5 (*a*, *b*) are formed using known techniques.

Any suitable method can be used to provide the n+ region 6; one method which has proved successful and readily predictable is to grow a semi-conductor crystal by pulling it out as it forms from a bath of molten germanium and, after a required length of n-type crystal has been formed, to stop pulling out; then add an appropriate quantity of a significant impurity, e.g. antimony to the bath and resume pulling out until a required length of n+ type crystal has formed.

A transistor is provided by the electrodes 5 (*a*, *b*) and one of the base electrodes 1, preferably that connected to the region 6.

In operation an exclusion current flows in the germanium by virtue of a voltage applied across the positive and negative connections to the base electrodes 1.

In a typical example a voltage of about ¼ to ½ volt applied between the exclusion base electrodes 1 produces an exclusion current of 2 milliamps. which in the case of a transistor results in an improvement in the collector back resistance-temperature characteristic and hence in the power gain-temperature characteristic; in the case of a crystal diode where only one of the electrodes 5 (*a*, *b*) is required there is a corresponding improvement in the rectifier back resistance.

In a transistor the power consumed in performing exclusion is probably of the order of 20% of the power used otherwise in the transistor circuit; such a figure it will be recognised is dependent upon the power in the actual circuit in which the transistor is connected.

Figure 8:
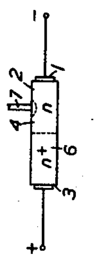
Fig. 8 shows a crystal diode device arranged for exclusion.

A crystal diode of the so-called alloy junction type making use of exclusion is shown in Fig. 8. It comprises a germanium body 3 having soldered base electrodes 1 at its ends; in the body 3 an n-type region 2 of conductivity say 0.5 ohm-cm. is contiguous with an n+ type region 6. An alloy junction is formed by alloying a blob of indium in known manner on the side 4 of the region 2; an electrode 7 is attached to the alloy junction. Any convenient method which will produce the typical p-type alloy where the contact 7 is connected to the region 2 may be used.

In operation an exclusion current flows between the base electrodes 1; the contact 7 and one of the base electrodes 1 constitute the connections of the crystal diode.

Although in this specification semi-conductor material of n-type conductivity has been referred to it is to be understood that the invention extends to p-type conductivity material and moreover, semi-conductor materials other than germanium may also be used.

We claim:

1. A semi-conductor device comprising a body of semi-conductor material defining first and second regions contiguous at a common boundary and of the same conductivity type, a first base electrode making direct ohmic contact with the first region, a second base electrode making ohmic contact with the second region, and at least one other electrode making rectifying contact with the first region, the second region having a high significant impurity concentration relative to that of the first region to inhibit minority carrier injection into the first region from the second region, whereby there is exclusion of minority carriers from the first region by uninhibited extraction therefrom and prevention of injection thereinto when an exclusion voltage is applied between the base electrodes.

2. A semi-conductor device as claimed in claim 1, wherein the semi-conductor material is germanium of n-type conductivity and the significant impurity is antimony.

3. A semi-conductor device comprising a mass of semi-conductor material, at least one electrode making rectifying contact with said mass, and exclusion means including an enhanced conductivity portion of said mass for preventing injection of unwanted minority carriers into the remainder of said mass and for facilitating removal of uncombined minority carriers in the remainder of said mass, and wherein the exclusion means includes a base electrode making direct ohmic contact with said remainder of the mass for accomplishing said facilitating.

4. A device as in claim 3 wherein said portion of the mass has a higher significant impurity concentration than said remainder of the mass, and the exclusion means includes a second base electrode making ohmic contact with said portion of the mass, and connections to said base electrodes for passing an exclusion current through said mass.

5. A semi-conductor device comprising a body of semi-conductor material defining first and second regions contiguous at a common boundary and of the same conductivity type, a first base electrode making ohmic contact with the first region, a second base electrode making ohmic contact with the second region, and at least one other electrode making rectifying contact with the first region, the second region having a high significant impurity concentration relative to that of the first region to inhibit minority carrier injection into the first region from the second region, whereby there is exclusion of minority carriers from the first region when an exclusion voltage is applied between the base electrodes, the arrangement being such that said other electrode in combination with one of said base electrodes to the exclusion of the other base electrode may be employed as electrodes of a transistor device.

6. A device as in claim 5 wherein the second base electrode and said other electrode are said transistor device electrodes.

7. A semi-conductor device comprising a main mass of semi-conductor material of a given conductivity type, at least one electrode making rectifying contact with said mass, and means for passing a minority carrier exclusion current through said main mass, said means including a second mass of semi-conductor material of said conductivity type but enhanced in conductivity relative to said main mass, said second and main masses being contiguous at a common boundary, said means further including first and second base electrodes for carrying said current and respectively making direct ohmic contact with the second mass and said main mass, said second mass operating to prevent injection of minority carriers into said main mass by said current, said second base electrode and its direct ohmic contact to the main mass operating to facilitate the extraction of uncombined minority carriers in said main mass.

8. A semi-conductor device comprising a body of semi-conductor material defining first and second regions contiguous at a common boundary and of the same conductivity type, a first base electrode making ohmic contact with the first region, a second base electrode making ohmic contact with the second region, two other electrodes in close proximity to each other making rectifying contact with the first region, said last two electrodes and one of said base electrodes constituting the emitter, collector and base electrodes of a transistor, the second region having a highly significant impurity concentration relative to that of the first region to inhibit minority carrier injection into the first region from the second region, whereby there is exclusion of minority carriers from the first region when an exclusion voltage is applied between the base electrodes.

9. A semi-conductor device comprising a body of semi-conductor material defining first and second regions contiguous at a common boundary and of the same conductivity type, a first base electrode making ohmic contact with the first region, a second base electrode making ohmic contact with the second region, and one other electrode making with the first region a rectifying contact of the alloy-junction type, said other electrode and one of the two base electrodes constituting the electrodes of an alloy-junction crystal diode, the second region having a high significant impurity concentration relative to that of the first region to inhibit minority carrier injection into the first region from the second region, whereby there is exclusion of minority carriers from the first region when an exclusion voltage is applied between the base electrodes.

10. A semi-conductor device comprising a germanium body of semi-conductor material of n-type conductivity, said body defining first and second regions contiguous at a common boundary, a first base electrode making ohmic contact with the first region, a second base electrode making ohmic contact with the second region, and one other electrode making with the first region a rectifying contact of the alloy-junction type, said other electrode and one of the two base electrodes constituting the electrodes of an alloy-junction crystal diode, the second region having antimony as a significant impurity in a high concentration relative to that of the first region to inhibit minority carrier injection into the first region from the second region, whereby there is exclusion of minority carriers from the first region when an exclusion voltage is applied between the base electrodes.

11. A semi-conductor device as claimed in claim 10, wherein the rectifying contact comprises an indium alloy junction.

References Cited in the file of this patent

UNITED STATES PATENTS

| | | |
|---|---|---|
| 2,502,479 | Pearson et al. | Apr. 4, 1950 |
| 2,603,694 | Kircher | July 15, 1952 |
| 2,654,059 | Shockley | Sept. 29, 1953 |
| 2,733,390 | Scalon | Jan. 31, 1956 |
| 2,761,020 | Shockley | Aug. 28, 1956 |